(12) United States Patent
Bell et al.

(10) Patent No.: US 6,787,593 B2
(45) Date of Patent: Sep. 7, 2004

(54) SOUND-DEADENING COMPOSITES OF METALLOCENE COPOLYMERS FOR USE IN VEHICLE APPLICATIONS

(75) Inventors: Steven E. Bell, Shippensburg, PA (US); Dwight D. Hull, East Berlin, PA (US); Jeffrey L. Rice, Chambersburg, PA (US); Dennis C. Young, Mechanicsburg, PA (US)

(73) Assignee: Lear Corporation, Southfield, MI (US)

( * ) Notice: Subject to any disclaimer, the term of this patent is extended or adjusted under 35 U.S.C. 154(b) by 15 days.

(21) Appl. No.: 10/106,780

(22) Filed: Mar. 27, 2002

(65) Prior Publication Data

US 2003/0187129 A1 Oct. 2, 2003

(51) Int. Cl.$^7$ ................................................. C08K 3/36
(52) U.S. Cl. ........................ 524/451; 156/334; 428/95; 428/96
(58) Field of Search ............................. 156/334; 428/95, 428/96; 524/451, 515, 438, 4, 448, 228, 274, 296, 553, 528, 577, 109, 13, 15, 427, 502, 423, 430, 435

(56) References Cited

U.S. PATENT DOCUMENTS

| | | | |
|---|---|---|---|
| 4,191,798 A | 3/1980 | Schumacher et al. | 428/95 |
| 4,222,924 A | 9/1980 | Schumacher | 260/33.6 |
| 4,263,196 A | 4/1981 | Schumacher et al. | 260/33.6 |
| 4,379,190 A | 4/1983 | Schenck | 428/95 |
| 4,403,007 A | 9/1983 | Coughlin | 428/95 |
| 4,430,468 A | 2/1984 | Schumacher | 524/109 |
| 4,434,258 A | 2/1984 | Schumacher et al. | 524/13 |
| 4,438,228 A * | 3/1984 | Schenck | 524/109 |
| 4,542,199 A | 9/1985 | Kaminsky et al. | 526/160 |
| 4,937,299 A | 6/1990 | Ewen et al. | 526/119 |
| 5,055,438 A | 10/1991 | Canich | 502/117 |
| 5,189,192 A | 2/1993 | LaPointe et al. | 556/11 |
| 5,246,783 A | 9/1993 | Spenadel et al. | 428/461 |
| 5,272,236 A | 12/1993 | Lai et al. | 526/348.5 |
| 5,278,272 A | 1/1994 | Lai et al. | 526/348.5 |
| 5,324,800 A | 6/1994 | Welborn, Jr. et al. | 526/160 |
| 5,349,100 A | 9/1994 | Mintz | 585/350 |
| 5,352,649 A | 10/1994 | Shibahashi et al. | 503/207 |
| 5,385,972 A | 1/1995 | Yamamoto et al. | 524/579 |
| 5,475,075 A | 12/1995 | Brant et al. | 526/348.3 |
| 5,530,065 A | 6/1996 | Farley et al. | 525/240 |
| 5,665,800 A | 9/1997 | Lai et al. | 524/115 |
| 5,763,501 A | 6/1998 | Bickhardt et al. | 521/142 |
| 5,783,638 A | 7/1998 | Lai et al. | 525/240 |
| 5,910,358 A | 6/1999 | Thoen et al. | 428/316.6 |
| 6,015,617 A | 1/2000 | Maugans et al. | 428/364 |
| 6,107,430 A | 8/2000 | Dubois et al. | 526/348.5 |
| 6,156,842 A | 12/2000 | Hoenig et al. | 525/171 |
| 6,207,748 B1 | 3/2001 | Tse et al. | 524/279 |
| 6,214,924 B1 * | 4/2001 | Bieser et al. | 524/515 |
| 6,225,410 B1 | 5/2001 | Sugimura et al. | 525/191 |
| 6,241,168 B1 | 6/2001 | Young et al. | 241/23 |
| 6,270,891 B1 | 8/2001 | Maugans et al. | 428/364 |
| 6,319,969 B1 * | 11/2001 | Walther et al. | 524/300 |

FOREIGN PATENT DOCUMENTS

| | | | |
|---|---|---|---|
| EP | 0 046 536 A1 * | 3/1982 | |
| EP | 0046536 A1 | 3/1982 | ........... C09D/3/393 |
| GB | 2070626 A | 9/1981 | |
| JP | 11349735 A | 12/1999 | ............ C08L/9/06 |
| JP | 2000053816 A | 2/2002 | ............ C08L/23/08 |
| WO | WO 97/33921 | 9/1997 | ............ C08F/2/00 |

* cited by examiner

Primary Examiner—Rober D. Harlan
(74) Attorney, Agent, or Firm—Bill C. Panagos; David J. Josephic

(57) ABSTRACT

Sound-deadening composites of metallocene copolymers having superior properties are used in automotive applications. Flexible composites having low temperature performance properties with improved elongation and impact strength are provided.

40 Claims, No Drawings

SOUND-DEADENING COMPOSITES OF METALLOCENE COPOLYMERS FOR USE IN VEHICLE APPLICATIONS

FIELD OF THE INVENTION

This invention relates to sound-deadening composites of metallocene copolymers for use in vehicle applications. More specifically, sound-deadening sheets or carpet backings are provided for use in vehicles.

BACKGROUND OF THE INVENTION

Sound-deadening composites of filled thermoplastic compositions are well known for use in automotive applications. The thermoplastic compositions typically comprise a polymer, plasticizer and filler. A number of patents have been granted for such highly filled thermoplastic compositions as represented by U.S. Pat. Nos. 4,191,798; 4,222,924; 4,263,196; 4,379,190; 4,403,007; 4,430,468; 4,434,258; and 4,438,228. Different systems of polymers, plasticizers and fillers have been proposed. For example, the above-mentioned patents disclose the use of ethylene interpolymers such as ethylene/vinyl ester, ethylene/unsaturated mono- or di-carboxylic acids, or esters of unsaturated acids, etc. Blends of such ethylene interpolymers with other elastomers and polymers have also been proposed.

Notwithstanding the proposal of many different polymer based compositions for use in sound-deadening composites, ethylene vinyl acetate (EVA) has been the most widely used on a commercial basis. However, there is a demand for improved materials which meet a number of balanced properties such as impact strength, tensile, elongation, flex modulus and specific gravity. In addition, where the sound-deadening composition or composite is used in certain applications such as carpet backing, a number of other requirements have been specified by automobile manufacturers. For example, automotive materials or parts must satisfy requirements of resistance to cold, mildew, fogging and flammability.

SUMMARY OF THE INVENTION

This invention is directed to sound-deadening composites for use in vehicles as prepared from compositions containing a metallocene copolymer, plasticizer and filler. These composites have been found to provide a balance of properties heretofore unachieved in commercial automotive applications for sound-deadening composites.

In particular, the metallocene copolymer composites of this invention provide superior low temperature performance, for example, exhibiting flexibility even at temperatures as low as −30° C. without cracking. In addition, improvements in elongation and impact strength far exceeding conventional EVA compositions have been obtained. Other processing problems normally encountered with thermoplastic compositions based on EVA are overcome by these new metallocene copolymer composites.

The sound-deadening composite is based on a metallocene copolymer of ethylene and an α-comonomer having from 4 to 10 carbon atoms, for example, selected from the group consisting of butene, hexene and octene, and mixtures thereof. Composites having the desired properties are obtained by blending the metallocene copolymer in an amount of from about 10 to about 30 percent by weight with an oil plasticizer from about 2 to about 7 percent by weight, and filler from about 60 to about 85 percent by weight. This combination of components enables economical manufacture of the far superior sound absorbing composite which meets the demand of balanced properties of impact strength, tensile, elongation, flex modulus and specific gravity. These composite materials also satisfy the requirements of resistance to cold, mildew, fogging and flammability.

DETAILED DESCRIPTION OF THE INVENTION

The highly filled composite compositions of this invention having the desired sound-deadening property consist essentially of a metallocene copolymer, suitable plasticizer and particulate inorganic filler in amounts to achieve the balanced properties. The metallocene copolymer suitable for use is a copolymer of ethylene and an α-comonomer having 4 to 10 carbon atoms, such as butene, hexene and octene, and mixtures thereof. The presently preferred metallocene copolymers have wide specifications such as a melt flow rate of about 1 to 10 g/10 minutes according to ASTM D 1238, and a density less than about 0.9 or, more particularly, from about 0.860 to about 0.9 g/cc. It has been found that, even with such wide spec material, economies are achieved without sacrificing the balance of properties.

While the metallocene copolymers of ethylene and octene have presently been found preferred, other comonomers such as butene or hexene may be employed with ethylene to provide the desired properties. Furthermore, the metallocene copolymers may be blended with other polyolefins such as polyethylene, polypropylene, low density polyethylene (LDPE), linear low density polyethylene (LLDPE), ultra low density polyethylene (ULDPE), and others, in amounts which do not materially affect the essential characteristics or advantages of the present invention.

The term "metallocene copolymer" is well understood to a person of ordinary skill in the art as related to those polymers prepared from metallocene or single site catalysts. The metallocene-catalyzed ethylene-based polymers used in the present invention are preferably wide spec metallocene copolymers. These materials are available from DOW Plastics, or Exxon Chemical Company under the trademarks Engage® or Exact®, respectively. Prime grades of these polymers, for example, include those sold under the names Engage 8500, Exact 3035, Exact 3027, Exact 4150 and Exact 4041. Engage 8500 is a polyolefin elastomer of ethylene-octene copolymer that has a melt index of 4–6 g/10 min under ASTM D1238, and a density of 0.8670–0.8730 g/cc according to ASTM D792. Exxon Exact 3035 and 3027 are ethylene-based butene plastomers each having a density of 0.9 g/cc and a melt flow of 3.5 g/10 min according to Exxon's methods. Exxon Exact 4041 is an ethylene-based butene plastomer having a density of 0.880 g/cc and a melt flow of 3.0 g/10 min according to Exxon's methods. Exxon Exact 4150 plastomer is an ethylene-based hexene plastomer having a density of 0.895 g/cc and a melt flow of 3.5 g/10 min according to Exxon methods. The metallocene process, and particularly the catalysts and catalyst support systems are the subject of patents including U.S. Pat. Nos. 4,542,199; 5,189,192; 5,352,649 and 5,349,100. There is a significant amount of information in the literature concerning these polymers that have been developed and reference may be made to, for example, U.S. Pat. Nos. 4,937,299; 5,272,236; 5,278,272; 5,665,800; and 5,783,638. All of these patents that relate to metallocene copolymers and the above commercial information available with respect to the available products are incorporated herein by reference.

The highly filled composite is made from an extrusion recipe of a composition which consists essentially of from about 10 to about 30 percent by weight of the metallocene copolymer with from about 2 to about 7 percent by weight plasticizer and from about 60 to about 85 percent by weight of inorganic particulate filler. The terms "consisting essentially of" mean that the named ingredients are essential, but other ingredients may be used providing they do not alter the material characteristics of the composite. Within these ranges of components, the desirable benefits of impact strength, tensile, elongation, flex modulus and specific gravity are obtained. Furthermore, the superior resistance to low temperatures has been achieved.

In a preferred mode according to the principles of this invention, a metallocene copolymer of ethylene and octene has been employed with wide spec properties of melt flow rate of about 1 to about 10 g/10 minutes according to ASTM D 1238 and a density of from about 0.860 to about 0.9 g/cc. More specifically, in the preferred mode, when amounts of this metallocene copolymer of ethylene and octene of about 18 to about 22 percent by weight are combined with essentially a paraffinic oil plasticizer of from about 3 to about 5 percent by weight and a calcium carbonate filler of from about 78 to about 82 percent by weight, superior performance properties have been achieved.

The plasticizer employed in the composition is preferably a hydrocarbon oil of the paraffinic or naphthenic type, and mixtures thereof. The plasticizing oil enables the high content of filler to wet out in the metallocene copolymer and render the composite more elastic for improved processing and use. Although plasticizers within the general range of from about 2 to about 7 percent by weight may be used, at higher levels they may start to bleed out of the composite, which is undesirable. The presently preferred plasticizer is essentially a paraffinic oil or a mixture of paraffinic and naphthenic oils with a minor amount of aromatics. More specifically, an oil such as Sunpar® 2280 which is a mixture of 71% paraffinic, 25% naphthenic, and 4% aromatic oils is one of the presently preferred hydrocarbon oils. The Sunpar oil is available from Sunoco, Inc. Other oils having varying amounts of paraffinic and naphethenic oils may be used.

An inorganic particulate filler is used in the composite to provide mass which enables sound-deadening properties to be economically achieved. However, there must be a balance between the amount of filler in relation to the metallocene copolymer so as not to sacrifice properties and advantages of this invention. Generally, the weight ratio of metallocene copolymer to filler is about 1:4. Inorganic fillers selected from the group consisting of calcium carbonate, barium sulfate, hydrated aluminum, and mixtures thereof may suitably be employed wherein the average particle size is on the order of about 3 to about 25 microns. Calcium carbonate is presently preferred, with an average particle size within the range of about 15 to about 25 microns, and has been found to achieve the desired economies in making and using the composites of this invention.

Other minor components are used in the composite compositions such as a heat stabilizer, moisture absorbent and processing aid to facilitate the compounding and extrusion of the ingredients.

The composites of this invention are made by blending the components and extruding them into pellets which then may be employed to fabricate either unsupported sheets, parts or carpet backing for use in automotive applications. For example, the metallocene copolymers are blended with the plasticizer and fillers, then fed into continuous mixers with other minor components, and then to an extruder followed by introduction into a pelletizer, fluidized bed, heater/dryer, and then into a cooler and classifier to provide the finished pellets.

This invention, its operating parameters and various modifications and equivalents will be further understood with reference to the following examples.

EXAMPLES

Example 1

Carpet Backing

A highly filled sound-deadening backing or sheet for automotive carpet was made from pellets having the following composition. The pellets were made as described above by continuous mixing and extruding the composition at about 425° F. The pellets were then fed to an extruder at temperatures of about 380° F. to 420° F. to form a sheet as backing for carpet.

| Component | Weight Percent |
| --- | --- |
| Metallocene Ethylene-Octene Copolymer (Wide Spec of about 0.885–0.9 g/cc and flow rate within range of about 1 to 10 g/10 min) | 17.78 |
| Paraffinic Oil (Sunpar 2280 ®) | 5 |
| Zinc Oxide | 0.57 |
| Heat Stabilizer | 0.4 |
| Process Aid | 0.2 |
| Low Density Polyethylene Polymer (LDPE) | 2.05 |
| Calcium Carbonate | 74 |

Example 2

Unsupported Sheet

A sound-deadening unsupported sheet was made from pellets as described in Example 1 and then extruded into a sheet at temperatures of about 380° F. to 450° F.

| Component | Weight Percent |
| --- | --- |
| Metallocene Ethylene-Octene Copolymer (Wide Spec of about 0.885–0.9 g/cc and flow rate within range of about 1 to 10 g/10 min) | 10.665 |
| Ultra Low Density Polyethylene (ULDPE) | 10.665 |
| Paraffinic Oil (Sunpar 2280 ®) | 3.5 |
| Zinc Oxide | 0.57 |
| Heat Stabilizer | 0.4 |
| Process Aid | 0.2 |
| Calcium Carbonate | 74 |

When the composition of Example 1 is used as a carpet backing, carpet face fibers may comprise polyamides and/or polyesters, typically nylon, as developed further in U.S. Pat. No. 6,241,168 which is incorporated herein by reference.

The composition of Example 1 was molded into sheet samples as described above to produce test specimens. With reference to Table 1, ⅛ inch injection molded samples were subjected to ASTM testing for Gardner impact, tensile, elongation, flex modulus and specific gravity.

TABLE 1

| ASTM TESTING* | SPEC/UNITS | ASTM TEST METHOD | EVA COMPOSITE | METALLOCENE COPOLYMER COMPOSITE |
|---|---|---|---|---|
| GARDNER IMPACT | joules | D 3029 | 8 | >18.1 |
| TENSILE | MPA | D 638 | 1.6 | 1.85 |
| ELONGATION | % | D 638 | 320 | >800% |
| FLEX MODULUS | MPA | D 790 | 105 | 45 |
| SPECIFIC GRAVITY | g/cc | D 792 | 1.8 | 1.75 |

In TABLE 1, the metallocene copolymer composite of Example 1 was compared to an EVA composite in order to demonstrate the far superior properties of the composites of this invention. The EVA composite is an example of a present production product based upon ethylene vinyl acetate (EVA) of about 18% and about 77% filler with an aromatic oil plasticizer. The far superior strength, elongation and flex modulus properties of the metallocene copolymer composite of this invention are demonstrated in TABLE 1. For example, the Gardner impact strength for the metallocene copolymer composite exceed 18.1 joules in comparison to 8 joules for the current EVA composite. A dramatic increase in the elongation of >800% was achieved for the metallocene copolymer composite in comparison to 320% for the EVA composite. Moreover, the flex modulus of the metallocene copolymer was 45 in comparison to the flex modulus of 105 for the EVA composite. Accordingly, the superior strength, elongation and flexibility of the composites of this invention are clearly demonstrated in TABLE 1. These properties also enable the composite composition of this invention to be more readily processed into parts and molded without tearing. It has also been found that the metallocene copolymer composite may be more readily bonded as a backing for carpet, for example, which enables the elimination of intermediate bonding scrim or other structures in the fabrication of sound-deadening products.

The metallocene copolymer composite of Example 1 was also compared to the EVA composite by making finished carpet samples of from about 0.3 pound to about 1 pound per square foot and then testing their cold resistance. The results are reported in TABLE 2 as follows:

TABLE 2

| COLD RESISTANCE | EVA COMPOSITE | METALLOCENE COPOLYMER COMPOSITE |
|---|---|---|
| ORIG B 6 MM | CRACK | NO CRACK |
| H/A 6 MM | CRACK | NO CRACK |

In TABLE 2, the first cold resistance test, designated "ORIG B 6 MM", involved bending the carpet sample around a 6 mm mandrel at (−30° C.). The second cold resistance test, designated "H/A 6 MM", involved heat aging the sample for 24 hours at 90° C. and then bending the sample around a 6 mm mandrel at (−30° C.). The EVA composite sample cracked when subjected to both tests, whereas the metallocene copolymer backed carpet sample did not crack under these test conditions. Accordingly, Table 2 demonstrates the superior cold temperature flexibility of the composite sheet materials of this invention in comparison to currently available EVA composites.

In addition, cold flex tests were performed on a sheet sample like that of Example 2 by bending each sample around different sized mandrels from 50 mm down to 6 mm, with and without heat aging, as above in Table 2. The results for the ORIG B and H/A tests are reported in Table 3 where the EVA composite cracked in all cases, whereas the metallocene copolymer composite of this invention did not crack in any case. Thus, the superior low temperature performance properties of the composite of this invention have been further demonstrated.

TABLE 3

|  | EVA COMPOSITE | METALLOCENE COPOLYMER COMPOSITE |
|---|---|---|
| ORIG B 50 MM | CRACK | NO CRACK |
| ORIG B 25 MM | CRACK | NO CRACK |
| ORIG B 13 MM | CRACK | NO CRACK |
| ORIG B 6 MM | CRACK | NO CRACK |
| H/A 50 MM | CRACK | NO CRACK |
| H/A 25 MM | CRACK | NO CRACK |
| H/A 13 MM | CRACK | NO CRACK |
| H/A 6 MM | CRACK | NO CRACK |

The above description of this invention and its various embodiments is not intended to be limiting, and a person of ordinary skill in the art will understand that various modifications of this invention in view of the above description may be made in order to achieve the advantages and objectives.

What is claimed is:

1. A sound-deadening composite for use in vehicles prepared from a composition consisting essentially of
   from about 10 to about 30 percent by weight of a metallocene copolymer of ethylene and at least one α-comonomer having from 4 to 10 carbon atoms,
   from about 2 to about 7 percent by weight of plasticizer, and
   from about 60 to about 85 percent by weight of particulate filler.

2. The composite of claim 1 wherein the weight ratio of metallocene copolymer to filler is about 1:4.

3. The composite of claim 1 wherein the metallocene copolymer is from about 18 to about 22 percent by weight, the plasticizer is from about 3 to about 5 percent by weight, and the filler is about 78 to about 82 percent by weight.

4. The composite of claim 1 wherein the metallocene copolymer has a density of less than about 0.9 g/cc.

5. The composite of claim 1 wherein the metallocene copolymer has a density of from about 0.860 to about 0.9 g/cc.

6. The composite of claim 1 wherein said α-comonomer is selected from the group consisting of butene, hexene and octene, and mixtures thereof.

7. The composite of claim 1 wherein the metallocene copolymer is a copolymer of ethylene and octene.

8. The composite of claim 1 wherein the metallocene copolymer is blended with another polyolefin polymer.

9. The composite of claim 8 wherein the polyolefin polymer is selected from the group consisting of polyethylene, polypropylene, low density polyethylene, linear low density polyethylene, and ultra low density polyethylene.

10. The composite of claim 9 wherein the polyolefin polymer is ultra low density polyethylene.

11. The composite of claim 1 wherein the filler is selected from the group consisting of calcium carbonate, barium sulfate, hydrated aluminum, and mixtures thereof.

12. The composite of claim 11 wherein the average particle size is on the order of about 3 to about 25 microns.

13. The composite of claim 1 wherein the plasticizer is a hydrocarbon oil.

14. The composite of claim 13 wherein the hydrocarbon oil is selected from the group consisting of a paraffinic oil and a naphthenic oil, and mixtures thereof.

15. The composite of claim 1 wherein said metallocene copolymer has a melt flow rate of about 1 to 10 g/10 minutes according to ASTM D 1238 and a density of from about 0.860 to about 0.9 g/cc.

16. The composite of claim 15 wherein the α-comonomer is selected from the group consisting of butene, hexene and octene, and mixtures thereof.

17. A sound-deadening composite for use in vehicles prepared from a composition consisting essentially of
   from about 10 to about 30 percent by weight of a metallocene copolymer of ethylene and a comonomer selected from the group consisting of butene, hexene and octene, and mixtures thereof, said metallocene copolymer having a melt flow rate of about 1 to 10 g/10 minutes according to ASTM D 1238 and a density of from about 0.860 to about 0.9 g/cc,
   from about 2 to about 7 percent by weight of an oil plasticizer, and
   from about 60 to about 85 percent by weight of particulate calcium carbonate filler.

18. The composite of claim 17 wherein the calcium carbonate has an average particle size of from about 3 to about 25 microns.

19. The composite of claim 17 wherein the metallocene copolymer is blended with ultra low density polyethylene.

20. The composite of claim 17 wherein the oil plasticizer is essentially a paraffinic oil.

21. A sound-deadening composite used as a backing for automotive carpet prepared from a composition consisting essentially of
   from about 10 to about 30 percent by weight of a metallocene copolymer of ethylene and at least one α-comonomer having from 4 to 10 carbon atoms,
   from about 2 to about 7 percent by weight of plasticizer, and
   from about 60 to about 85 percent by weight of particulate filler.

22. The composite of claim 21 wherein the weight ratio of metallocene copolymer to filler is about 1:4.

23. The composite of claim 21 wherein the metallocene copolymer is from about 18 to about 22 percent by weight, the plasticizer is from about 3 to about 5 percent by weight, and the filler is about 78 to about 82 percent by weight.

24. The composite of claim 21 wherein the metallocene copolymer has a density of less than about 0.9 g/cc.

25. The composite of claim 21 wherein the metallocene copolymer has a density of from about 0.860 to about 0.9 g/cc.

26. The composite of claim 21 wherein said α-comonomer is selected from the group consisting of butene, hexene and octene, and mixtures thereof.

27. The composite of claim 21 wherein the metallocene copolymer is a copolymer of ethylene and octene.

28. The composite of claim 21 wherein the metallocene copolymer is blended with another polyolefin polymer.

29. The composite of claim 28 wherein the polyolefin polymer is selected from the group consisting of polyethylene, polypropylene, low density polyethylene, linear low density polyethylene, and ultra low density polyethylene.

30. The composite of claim 29 wherein the polyolefin polymer is ultra low density polyethylene.

31. The composite of claim 21 wherein the filler is selected from the group consisting of calcium carbonate, barium sulfate, hydrated aluminum, and mixtures thereof.

32. The composite of claim 31 wherein the average particle size is on the order of about 3 to about 25 microns.

33. The composite of claim 21 wherein the plasticizer is a hydrocarbon oil.

34. The composite of claim 33 wherein the hydrocarbon oil is selected from the group consisting of a paraffinic oil and a naphthenic oil, and mixtures thereof.

35. The composite of claim 21 wherein said metallocene copolymer has a melt flow rate of about 1 to 10 g/10 minutes according to ASTM D 1238 and a density of from about 0.860 to about 0.9 g/cc.

36. The composite of claim 35 wherein the α-comonomer is selected from the group consisting of butene, hexene and octene, and mixtures thereof.

37. A sound-deadening composite used as a backing for automotive carpet prepared from a composition consisting essentially of
   from about 10 to about 30 percent by weight of a metallocene copolymer of ethylene and a comonomer selected from the group consisting of butene, hexene and octene, and mixtures thereof, said metallocene copolymer having a melt flow rate of about 1 to 10 g/10 minutes according to ASTM D 1238 and a density of from about 0.860 to about 0.9 g/cc,
   from about 2 to about 7 percent by weight of an oil plasticizer, and
   from about 60 to about 85 percent by weight of particulate calcium carbonate filler.

38. The composite of claim 37 wherein the calcium carbonate has an average particle size of from about 3 to about 25 microns.

39. The composite of claim 37 wherein the metallocene copolymer is blended with ultra low density polyethylene.

40. The composite of claim 37 wherein the oil plasticizer is essentially a paraffinic oil.

* * * * *